United States Patent
Bagley et al.

(10) Patent No.: US 8,509,711 B1
(45) Date of Patent: Aug. 13, 2013

(54) WIRELESS TERMINALS, SYSTEMS, AND METHODS USING INTERLACED DIPLEXERS

(75) Inventors: Zachary C. Bagley, Salt Lake City, UT (US); Thomas R. Giallorenzi, Sandy, UT (US); Radivoje Zarubica, Salt Lake City, UT (US); Robert G. Rebolledo, Park City, UT (US); Richard G. Edwards, Grantsville, UT (US); Robert M. Gillespie, Salt Lake City, UT (US); Linda J. McMillin, Park City, UT (US); Stephen M. Dudley, South Jordan, UT (US)

(73) Assignee: L-3 Communications Corp., New York, NY (US)

( * ) Notice: Subject to any disclaimer, the term of this patent is extended or adjusted under 35 U.S.C. 154(b) by 452 days.

(21) Appl. No.: 12/987,823

(22) Filed: Jan. 10, 2011

Related U.S. Application Data (60) Provisional application No. 61/294,039, filed on Jan. 11, 2010.

(51) Int. Cl.
 *H04B 1/50* (2006.01)
 *H04B 1/00* (2006.01)

(52) U.S. Cl.
 USPC ........................................ 455/103; 455/150.1

(58) Field of Classification Search
 USPC ................. 333/132; 455/150.1, 188.1, 553.1, 455/103, 500
 See application file for complete search history.

(56) References Cited

U.S. PATENT DOCUMENTS

| | | | |
|---|---|---|---|
| 6,845,231 B2 | 1/2005 | Frank | |
| 7,062,249 B2 * | 6/2006 | Park et al. | 455/335 |
| 7,126,440 B2 | 10/2006 | Bradley et al. | |
| 7,587,177 B1 | 9/2009 | Kwong | |
| 8,290,536 B2 * | 10/2012 | Kenington et al. | 455/553.1 |
| 2005/0032548 A1 | 2/2005 | Frank | |
| 2005/0192055 A1 * | 9/2005 | Niemela et al. | 455/561 |
| 2005/0227631 A1 | 10/2005 | Robinett | |
| 2008/0151790 A1 | 6/2008 | Lee et al. | |
| 2009/0141653 A1 | 6/2009 | McNeill et al. | |
| 2009/0252088 A1 | 10/2009 | Rao et al. | |
| 2009/0285135 A1 | 11/2009 | Rousu et al. | |
| 2010/0091690 A1 | 4/2010 | Boyle | |
| 2010/0134202 A1 | 6/2010 | Leinonen et al. | |
| 2012/0182948 A1 * | 7/2012 | Huang et al. | 370/329 |

FOREIGN PATENT DOCUMENTS

WO    WO 2008002436    1/2008

* cited by examiner

*Primary Examiner* — Dean O Takaoka
(74) *Attorney, Agent, or Firm* — Kirton McConkie

(57) ABSTRACT

Wireless terminals, systems, and methods use interlaced diplexers. A first diplexer can provide a first pair of bands separated by a first separation band, and a second diplexer can provide a second pair of bands separated by a second separation band. The first separation band and the second separation band can overlap. Transceivers (comprising transmitters and receivers) can be coupled to the diplexers to provide frequency-division duplex communications using one or both of the pairs of bands.

18 Claims, 8 Drawing Sheets

WIRELESS TERMINALS, SYSTEMS, AND METHODS USING INTERLACED DIPLEXERS

This application claims the benefit of U.S. Provisional Patent Application Ser. No. 61/294,039 filed on Jan. 11, 2010, entitled "Quadplexer/Hexplexer," by the present inventors, and which is herein incorporated by reference in its entirety.

FIELD

The present application relates to wireless communications systems. More particularly, the present application relates to wireless terminals, systems, and methods using interlaced diplexers.

BACKGROUND

Wireless communications is becoming increasingly important, with wireless systems finding their way into every growing numbers of applications. Wireless systems are become ubiquitous in the military environment.

In many wireless systems, it is desirable to provide two-way communications. Two way communications can be achieved through so-called frequency-division duplex operation. In the case of frequency-division duplex, two different frequencies are used, wherein a terminal can simultaneously (continuously) transmit on one frequency while receiving on the other frequency. For example, in a hub and spoke network, a hub terminal typically transmits on a first frequency and receives on a second frequency. The spoke terminals thus receive on the first frequency and transmit on the second frequency. Accordingly, the spoke terminals can each directly communicate with the hub terminal, but not with each other.

For hub and spoke terminals, frequency-division duplex operation is an acceptable way of providing full duplex communications. Frequency-division duplex is difficult to apply in other network types. For example, a set of terminals which are all configured to receive on the first frequency and transmit on the second frequency cannot establish direct communications with each other. Thus, frequency-division duplex is difficult to apply in a mesh network. While terminals can be split into two different types, e.g. a first terminal type ("type A") which transmits on the first frequency and receives on the second frequency and a second terminal type ("type B") which transmits on the second frequency and receives on the first frequency. Thus, type A terminals can directly communicate with type B terminals (and vice versa). Type A terminals cannot, however, communicate directly with other type A terminals, and type B terminals cannot communicate directly with other type B terminals. This can present difficulty, for example, when there are not enough of a particular type of terminal to provide the desired connectivity in a network, or when terminals move around resulting in a changing network topology. The different types of terminals are sometimes referred to as "genders" and the difficulties associated with having two different terminal types is sometimes referred to as the "gender problem."

An alternative to frequency-division duplex is time-division duplex, where all transmissions occur on the same frequency. Time is shared between the transmitter and receiver, with the transmitter and receiver taking turns at (discontinuously) transmitting/receiving bursts of data. While time-division duplex can reduce gender problems, time-division-duplex has several other disadvantages. Because time division duplex data must be burst at a higher rate, this translates into lower communication range for a given transmission power. In addition, timing must be coordinated between different terminals to ensure that the transmission and reception intervals are properly synchronized. Furthermore, two terminals which are scheduled to transmit in the same time interval cannot communicate directly.

Accordingly, it has been recognized by the present inventors that there is a need for improved duplexing techniques.

SUMMARY

In some embodiments of the invention, a wireless communications terminal is provided. The terminal can include at least two wireless transmitters and at least two wireless receivers. At least two interlaced diplexers can be coupled to the wireless transmitters and the wireless receivers. A first diplexer can have a first transmit band and a first receive band separated by a first separation band, and a second diplexer can have a second transmit band and a second receive band separated by a second separation band. Either the first transmit band or the first receive band can be within the second separation band. Similarly, either the second transmit band or the second receive band can be within the first separation band.

In some embodiments of the invention, a wireless communications terminal is provided that includes a first transceiver and a second transceiver, each capable of frequency division duplex operation. A first diplexer can be coupled to the first wireless transceiver and can provide duplexing for a first pair of bands separated by a first separation band. A first antenna can be coupled to the first diplexer. A second diplexer can be coupled to the second wireless transceiver and can provide duplexing for a second pair of bands separated by a second separation band. The first separation band and the second separation band partially overlap. A second antenna can be coupled to the second diplexer and spaced apart from the first antenna.

In some embodiments of the invention, a method of operating a wireless network is provided. The method can include providing a first terminal and a second terminal. The first terminal can include a diplexer, wherein the first terminal transmits within a first frequency band and receives within a second frequency band. The first frequency band and the second frequency band can be separated by a first separation band. The second terminal can include an interlaced diplexer, wherein the second terminal transmits within the second frequency band and receives within the first frequency band, and wherein the second terminal also transmits within a third frequency band and receives within a fourth frequency band. The third frequency band and the fourth frequency band can be separated by a second separation band, and one of the first frequency band and the second frequency band can be within the second separation band, and one of the third frequency band and the fourth frequency band can be within the first separation band. The method can include establishing full duplex communications between the first terminal and the second terminal using the first frequency band and the second frequency band.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a terminal includes reference to one or more terminals.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives or to only one of the listed alternatives at a time, unless the context clearly indicates otherwise.

Figure 1:
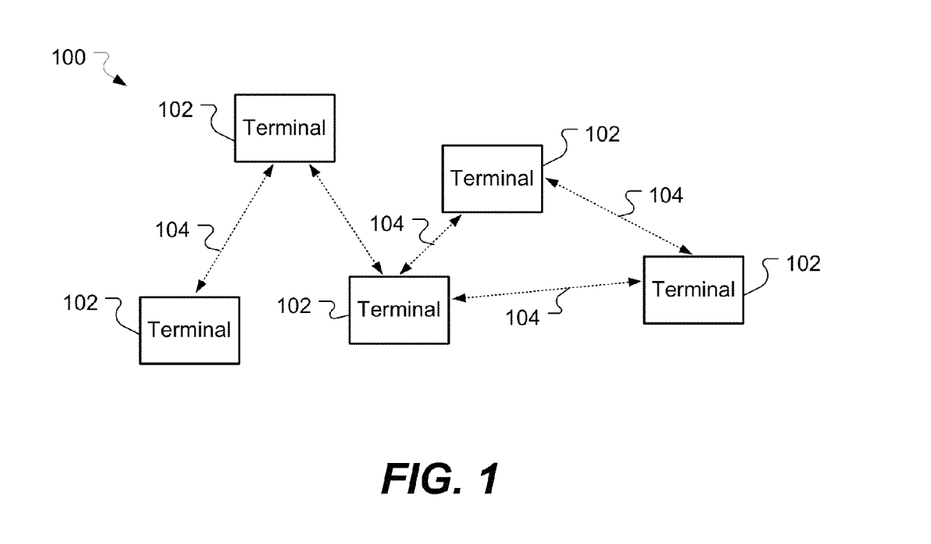
FIG. 1 is a block diagram of a wireless system in accordance with some embodiments of the present invention.

Turning to FIG. 1, a wireless system is illustrated in accordance with some embodiments of the present invention. The wireless system, shown generally at 100, can include a plurality of terminals 102. Communications links 104 can be established between the terminals. The communications links can use frequency-division duplex. As will be described in further detail herein, the communications links can use a plurality of transmit bands and receive bands. As introduced above, terminals can have a particular gender when using frequency-division duplex. As will be explained in further detail below, the terminals in the wireless system can have more than two different gender types. This can provide for a number of different network geometries not previously possible with conventional frequency-division duplex.

Figure 2:
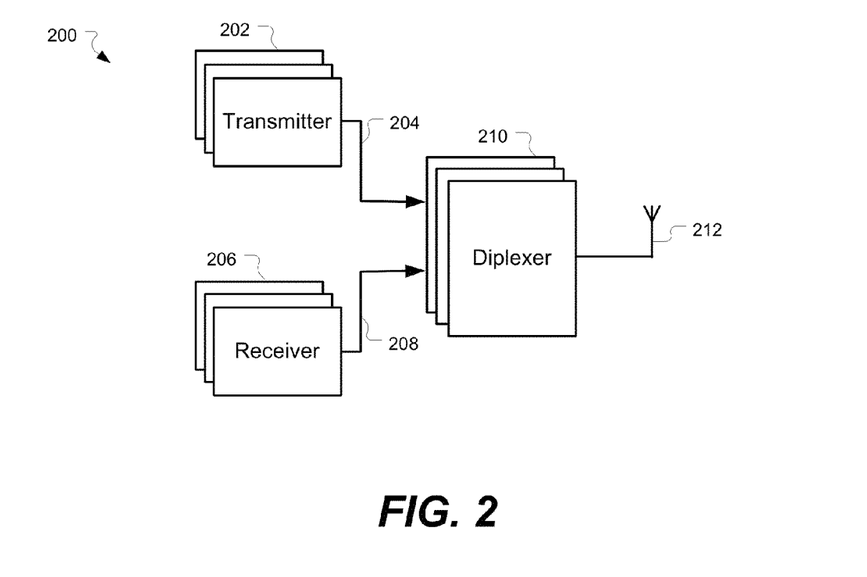
FIG. 2 is a block diagram of a wireless terminal in accordance with some embodiments of the present invention.

Turning to FIG. 2, an example of a wireless terminal in accordance with some embodiments of the present invention is illustrated. The terminal 200 can, for example, be used as a terminal 102 in the system 100 of FIG. 1. The terminal 200 can include two or more transmitters 202. For example, the transmitters can accept input data to be transmitted and output a radio frequency transmit signal 204 into which the input data has been encoded. The transmitters can be controllable to specify a transmission frequency on which the radio frequency transmit signal is generated. The transmitters can include components such as, for example, encoders, modulators, spread spectrum spreaders, upconverters, amplifiers, frequency references, filters, and the like. The terminal can also include two or more receivers 206. The receivers can accept a radio frequency receive signal 208 and provide output data which has been decoded from the receive signal. The receivers can be controllable to specify a reception frequency on which the radio frequency receive signal is received.

The transmitters 202 and receivers 206 can be coupled to one or more interlaced diplexers 210. For example, each pair of one transmitter and one receiver can be coupled to one diplexer. Each diplexer can provide filtering between a transmit band and a receive band which are separated by a separation band. The diplexers can be interlaced as follows. A first diplexer can have a first transmit band and a first receive band separated by a first separation band. A second diplexer can have a second transmit band and a second receive band. Either the first transmit band or the first receive band can be within the second separation band, and conversely either the second transmit band or the second receive band can be within the first separation band. In other words, the first separation band and the second separation band overlap.

Figure 3:
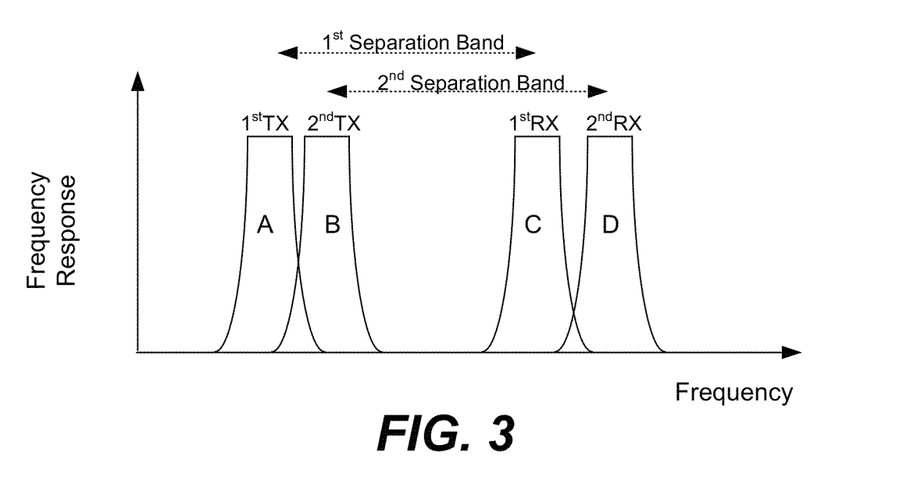
FIG. 3 is a graph of the frequency response of two interlaced diplexers in accordance with some embodiments of the present invention.

For example, FIG. 3 illustrates an example of the frequency response of two interlaced diplexers, showing the frequency response (vertical axis) as a function of frequency (horizontal axis). Each diplexer can include two bandpass filters to provide the transmit band and the receive band. The passband of the first transmit band is separated from the passband of the first receive band by a first separation band. Similarly, the passband of the second transmit band is separated from the passband of the second receive band by a second separation band. It can be seen that, in this example, the second transmit band is within the first separation band. Similarly, the first receive band is within the second separation band. The various bands can be selected in any desired spectral range. For example, the various bands can be within the Ku band, the Ka band, L band, S band, X band, or other frequency band. In general, the separation between the transmit and the receive bands can be relatively large compared to the bandwidth of the individual transmit and receive bands. In other words, the bandwidth of the first separation band can be substantially greater than the bandwidth of any of the first transmit band, second transmit band, first receive band, or second receive band. The separation between the transmit and receive bands can also be relatively large compared to the separation between two different transmit bands. In other words, the bandwidth of the first separation band can be substantially larger than a third separation band between the first transmit band and the second transmit band.

The inclusion of interlaced diplexers can allow the terminal 200 to operate using frequency division duplex using two different pairs of frequency simultaneously. For example, the terminal can provide for continuous full duplex communications using bands A and C while simultaneously providing continuous full duplex communications using bands B and D. Moreover, flexibility can be provided with respect to assignment of transmit/receive to the different bands. This can provide a number of benefits. For example, a conventional terminal with conventional diplexers, even when using multiple transceivers, is generally limited to operating with only a single gender (e.g., using only bands A and C). Thus, it is not generally possible for a terminal to operate one transceiver transmitting in band A and receiving in band C and another transceiver transmitting in band C and receiving in band A. This is because the transceivers will interfere with each other—there is no filtering providing between the transceivers. Thus, terminals must be either gender AC or gender CA. In contrast, when using interlaced diplexers, significantly greater flexibility can be obtained. For example, a terminal can use two transceivers which are the same gender (e.g., using bands A and C) without interference, or a terminal can use two transceivers which use different bands (e.g., one using bands A and C, the other using bands B and D). When using two interlaced diplexers, rather than being limited to two genders (i.e., AC and CA), a terminal can potentially use combinations of four different genders (i.e., AC/BD, AC/DB, CA/BD, CA/DB) as explained further below. This can provide significant benefits in managing connectivity in a network as will become apparent from discussions further below.

Returning to FIG. 2, to complete the description of the terminal 200, antennas 212 can also be included in the terminal. For example, the interlaced diplexers 210 can be coupled to corresponding antennas 212. The antennas can provide for physical radiation and capture of propagating radio signals. If desired, a physical separation between the antennas can be provided. For example, a first diplexer can be coupled to a first antenna which is physically separated from a second antenna to which a second diplexer is coupled. The physical separation can provide an amount of isolation which can be used in addition to isolation provided by the diplexers as will now be explained.

Figure 4:
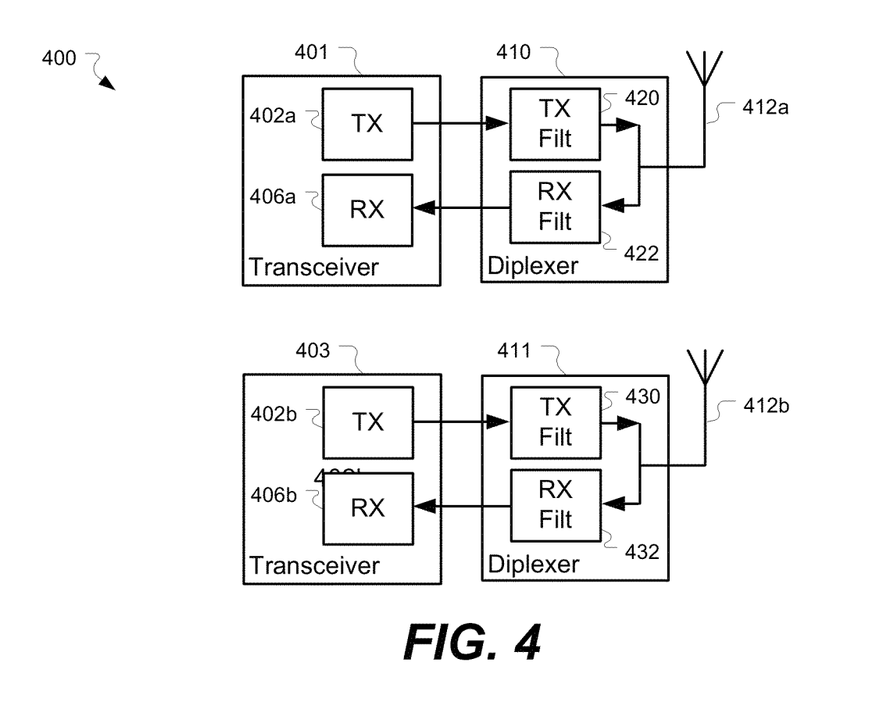
FIG. 4 is a block diagram of another example of a wireless terminal in accordance with some embodiments of the present invention.

We now consider isolation provided by the diplexers. The diplexer can be used to connect a transmitter and a receiver to a shared antenna. For example, FIG. 4 illustrates an example of another embodiment of a terminal 400 wherein multiple antennas 412a, 412b are included. The terminal can be used, for example, as the terminal 102 in the system 100 of FIG. 1.

The terminal 400 can include a first transceiver 401, having a first transmitter 402a and a first receiver 406a. The first transceiver can be coupled to a first diplexer 410. The terminal can also include a second transceiver 403, having a second transmitter 402b and a second receiver 406b. The second transceiver can be coupled to a second diplexer 411. The first diplexer and second diplexer can be interlaced as described above.

The diplexers 410, 411 can help to avoid self jamming, where the transmitted signals from the transmitters 402a, 402b adversely affect operation of the receivers 406a, 406b. The diplexers can help to reduce the power presented to the receiver input by the transmit signal by rejecting the receive band with the transmit band filter response.

For example, turning to the first diplexer 410 (providing the first transmit band and the first receive band), the diplexer can include two filters: a transmit filter 420 and a receive filter 422. The transmit filter can have a pass band corresponding to the first transmit band and a reject band corresponding to the first receive band. The reject band can help to eliminate noise/spurious emitted by the transmitter which would fall into the receive band causing interference/jamming to the receiver. For example, the amount of rejection can be sufficient so that noise/spurious from the transmitter is attenuated by a desired amount (e.g., 6 dB, 10 dB, 13 dB, etc.) below the noise floor of the receiver. The receive filter can have a pass band corresponding to the first receive band and a reject band corresponding to the first transmit band. The reject band can help to reduce/suppress the transmit signal from cause front end overload of the receiver. For example, the amount of rejection can be sufficient so that the transmit signal is attenuated a desired amount (e.g., 3 dB, 10 dB, 20 dB, etc.) below the 1-dB compression point of the receiver.

Accordingly, the amount of isolation between the first transmit band and the first receive band can be expressed in terms of the transmit filter rejection in the receive band, the receive filter rejection in the transmit band, or the combination of both. The filters 420, 422 can be designed to provide the desired amount of isolation. The amount of isolation desired can be determined from the transmitter 402a output power level, transmitter spectral characteristics, receiver 406a internal noise floor, and receiver 1 dB compression point. For example, the amount of isolation can be greater than about 120 dB, greater than about 100 dB, or other desired value.

Similar analysis can be conducted for the second diplexer 411 with respect to a second transmitter 402ab and second receiver 406b to obtained desired isolation between the second transmit band and the second receive band for the second transmit filter 430 and second receive filter 432.

We also consider cross-band isolation provided between the first transmit band and the second receive band, and between the second transmit band and the first receive band. In some embodiments, the antenna 412a coupled to the first transceiver 401 can be co-located with the antenna 412b coupled to the second transceiver 403. In this case, the isolation desired between the first transmit band and the second receive band can be similar to the isolation between the first transmit band and the first receive band.

In some embodiments, the antennas 412a, 412b can be spatially separated from each other. In this case, the physical separation distance can provide additional isolation between the different bands. Thus, the total isolation can be a sum of the isolation provided by the diplexer(s) and the isolation provided by the physical separation. The additional isolation provided by a physical separation can be taken advantage of to permit a reduction in the isolation desired within the diplexer. For example, the isolation between the first transmit band and the second receive band can be reduced relative to the isolation between the first transmit band and the first receive band. Similarly, the isolation between the second transmit band and the first receive band can also be reduced relative to the isolation between the second transmit band and the second receive band.

Figure 5:
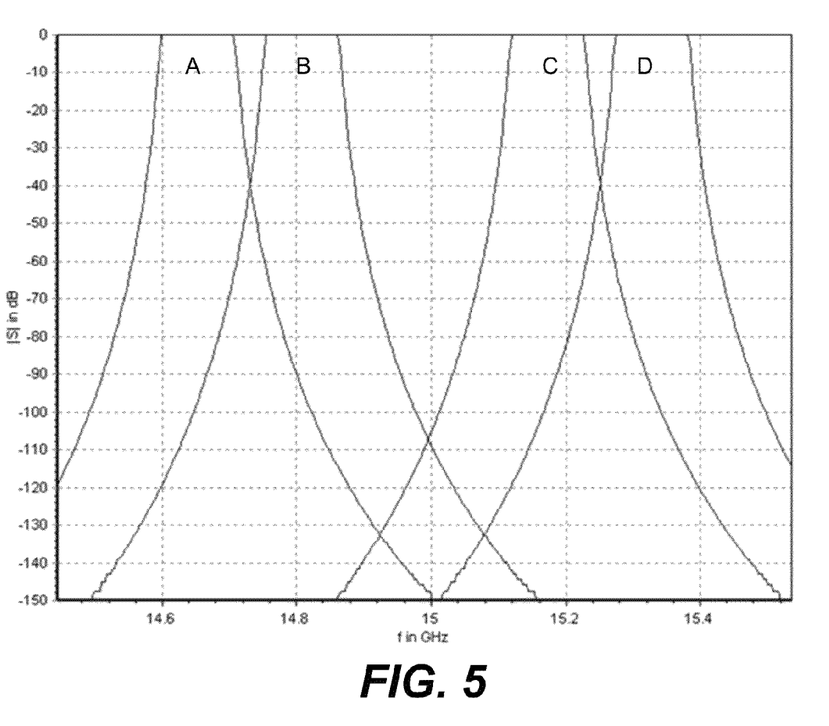
FIG. 5 is a graph of the frequency response of a pair of interlaced Ku-band diplexers having reduced cross-band isolation between some bands in accordance with some embodiments of the present invention.

Turning to FIG. 5, an example of the frequency response of a pair of interlaced diplexers providing reduced cross-band isolation is illustrated. The four bands have been labeled A, B, C, and D. For example, the first transmit band can be the A band, the first receive band can be the C band, the second transmit band can be the B band, and the second receive band can be the D band. Of course other combinations may also be used (e.g., swapping transmit/receive for one or both of the A-C and B-D pairs). Considering the pairs A-C and B-D, it can be seen that the filters provide an isolation of at least 130 dB between the bands. Thus, when A is used for transmit and C is used for receive (or vice versa), isolation of at least 130 dB is provided between the transmitter and the receiver coupled to the diplexer. Similar performance is provided between the B-D bands.

Note that the interlaced diplexers also provide crossband isolation (e.g., between A-D, B-C, A-B, etc.). For example, isolation between the B and C band is at least 105 dB, and isolation between the A and D band is at least 150 dB.

In some situations (e.g., gender changing terminals as described further below), it is possible that a transmit band might be right next to a receive band. For example, the first transmit band can be the A band, the first receive band can be the C band, the second transmit band can be the D band, and the first transmit band can be the B band. In such a case, isolation between the A-B and C-D bands is helpful. The isolation between the A-B bands is at least 40 dB and the isolation between the C-D bands is at least 40 dB. Additional isolation can be provided by physical separation. For example, if the first transmitter/receiver on a first antenna uses A-C and the second transmitter/receiver on a second antenna (physically separated from the first antenna) uses B-D, the following isolation is provided. Isolation between the transmitter/receiver pair on each antenna is at least 130 dB. Isolation between A-D is at least 150 dB plus additional isolation due to the physical separation. Isolation between B-C is at least 105 dB plus additional isolation due to the physical separation. And finally, isolation between A-B and C-D is at least 40 dB plus additional isolation due to physical separation. Using the above example, if a total isolation between any transmitter and any receiver of 100 dB is desired, and combination of bands can be used if at least 60 dB of isolation is provided by the physical separation.

Figure 6:
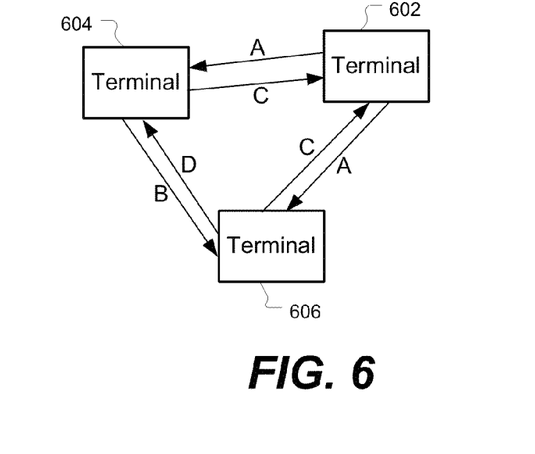
FIG. 6 is a block diagram of a communication network having a triangle connection in accordance with some embodiments of the present invention.

Using the terminal 200, various network configurations that were not previously possible in frequency-division duplex are now possible. For example, FIG. 6 illustrates an example of a communication network 600 which includes a triangle connection between three terminals 602, 604, 606. The three terminals are all capable of direct, continuous communications with each other. For example, terminal 602 can communicate with terminal 604 using bands A and C. Band A is used to transmit from terminal 602 to terminal 604, and band C is used to transmit from terminal 604 to terminal 602; bands A and C thus correspond to first transmit and receive bands. Terminal 602 can thus be described as being gender AC and terminal 604 can be described as being gender CA. Terminal 602 can also directly communicate with terminal 606 using bands A and C. Terminal 606 is therefore also gender CA. Terminal 604 and terminal 606 can directly communicate using bands B and D (terminal 604 is gender BD, and terminal 606 is gender DB). Bands B and D can thus correspond to second transmit and receive bands. The bands can be interleaved. In this example, a terminal can therefore have any combination of the two different genders to provide four different cases: AC/BD, AC/DB, CA/DB, and CA/BD.

Figure 7:
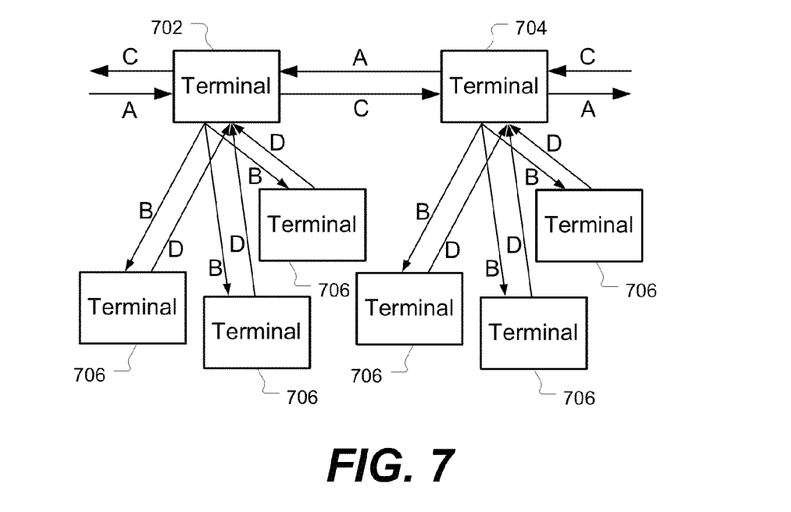
FIG. 7 is block diagram of a communication network having a dissemination structure in accordance with some embodiments of the present invention.

FIG. 7 illustrates an example of another communications network 700 which includes a dissemination structure. Terminals 702, 704 serve as broadcast nodes, providing connections (e.g., a hub and spoke network) to terminals 706 using B and D. Cross links between the terminals 702, 704 are provided using A and C.

Figure 8:
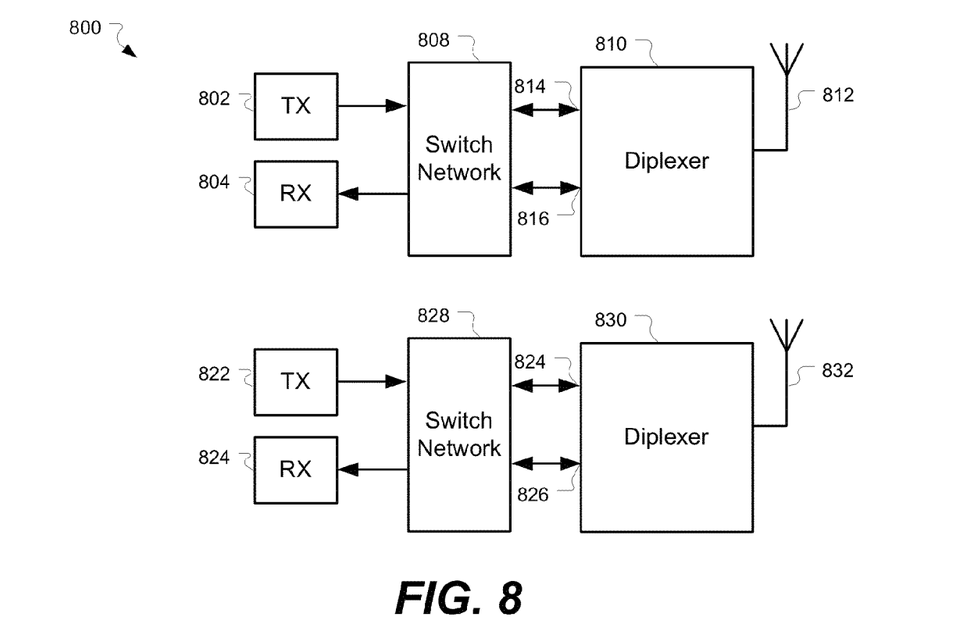
FIG. 8 is a block diagram of a wireless terminal that can change gender in accordance with some embodiments of the present invention.

While the above described network configurations can be implemented using terminals which have fixed genders, even more flexibility can be obtained with terminals that are capable of operationally switching gender. For example, FIG. 8 illustrates a block diagram of a terminal 800 which can change gender. The terminal 800 can, for example, be used as a terminal in any of the systems shown in FIGS. 1, 6 and 7. The terminal can include a first transmitter 802 and a first receiver 804. The first transmitter and receiver can be coupled to a first diplexer 810 via a first switch network 808. For example, the switch network can be a transfer switch. The diplexer can provide for operation of the transmitter and receiver with a first antenna 812. The switch network can allow for connection of the transmitter to either port 814, 816 of the diplexer and connection of the receiver to the other port. The diplexer can be bidirectional (e.g., cavity filters) in that transmission or reception can occur through any port. Thus, for example, if the diplexer provides both an A-band port 814 and a C-band port 816, the A-band port can be used for either transmission or reception, and the C band can be used for either reception or transmission. Thus, the transmit band and receive band can be swapped, allowing the terminal to change gender (e.g., between AC and CA) during operation.

The terminal 800 can also include a second transmitter 822 and a second receiver 824. The second transmitter and receiver can be coupled to a second diplexer 830 via a second switch network 828 (connecting to a B-band port 824 and D-band port 826), which can connect to a second antenna 832. The second switch network can operate similarly to the first switch network, allowing the second transmitter and receiver to operate on B and D and swap the transmit and receive band during operation, if desired. The first diplexer and second diplexer can be interlaced. For example, the frequency coverage of the A, B, C and D bands can be ordered such that A<B<C<D. For this example, the terminal can be any of four different genders: AC/BD, AC/DB, CA/BD, and CA/DB.

If desired, one or the other of the switch networks 808, 828 can be omitted to provide a terminal with partially switchable genders. For example, if switch network 828 is omitted (and the transmitter 822 is connected to the B-band port 824 and the receiver 824 is connected to the D-band port 826), the terminal can operationally switch between either of two genders: AC/BD and CA/BD.

Figure 9:
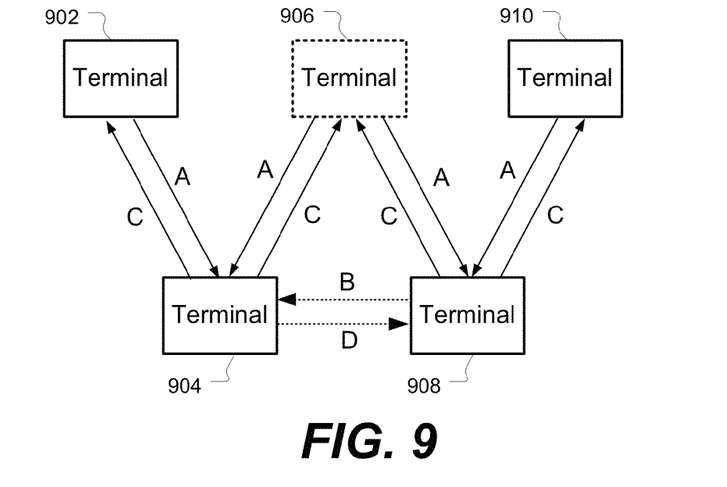
FIG. 9 is a block diagram of a network configuration that can reestablish communications when a node is disconnected in accordance with some embodiments of the present invention.

The ability of a terminal to change gender can be helpful in mobile and other networks where changing connectivity is present. For example, FIG. 9 illustrates an example network where a series of terminals 902, 904, 906, 908, 910 are in full duplex communication using two frequency bands A and C. The network is effectively a chain of terminals which can communicate either directly (for adjacent terminals) or via one or more hops (through intermediary terminals). For example, communications from terminal 904 to terminal 908 can be accomplished via terminal 906. Such a network, can, for example, operate using conventional diplexers. Terminals 902, 608, 910 are gender "AC" and terminals 904, 908 are gender "CA" and communications are possible between terminals of opposite gender that are within range of each other.

If terminal 906 becomes disconnected (e.g., goes out of range or ceases functioning), the network becomes fragmented. No communications path exists between terminal 904 and terminal 908. When using conventional diplexers, reestablishing connection between terminals 904 and 908 is not generally possible. This is because terminals 904 and 908 are each using the same gender (CA). If terminal 904 switches gender to communicate with terminal 908 (i.e., switches to AC), this will cause the connection to terminal 902 to fail (since terminal 902 and 904 would both be gender AC). Conversely, if terminal 908 changes gender (i.e., switches to AC) to communicate with terminal 904, this will cause the connection to terminal 910 to fail (since both terminal 908 and 910 would be gender AC).

In contrast, maintaining connectivity can be provided by some embodiments of the present invention by using the additional frequency bands provided by the interlaced diplexers. Terminals 904 and 908 can continue to operate using frequency bands A and C, but can use a second diplexer to also operate using frequency bands B and C. Thus a new link can be established directly between terminals 904 and 908 (i.e., configuring terminal 904 to be gender CA/DB and configuring terminal 908 to be gender CA/BD).

Figure 10:
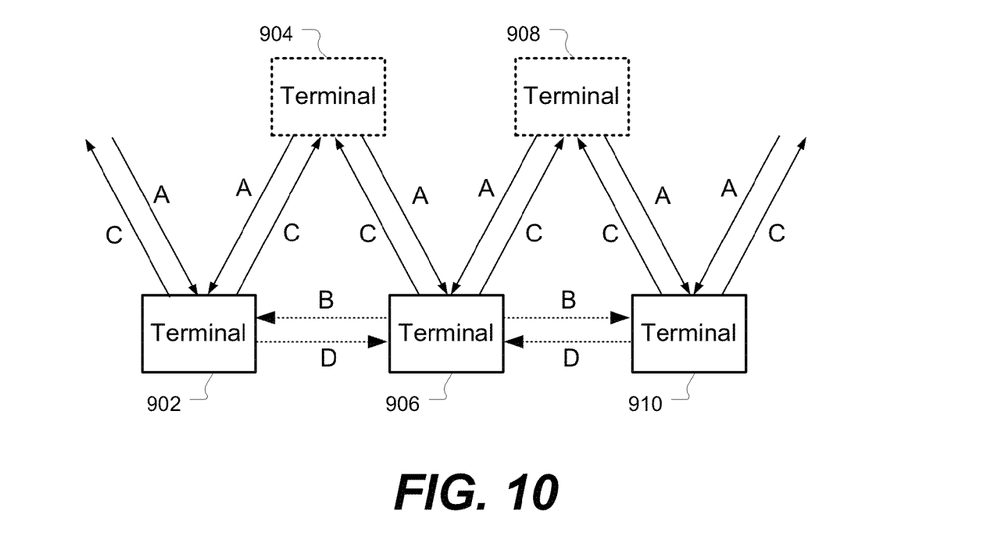
FIGS. 10-11 are block diagrams showing examples of reconnecting networks when two nodes are disconnected in accordance with some embodiments of the present invention.
Figure 11:
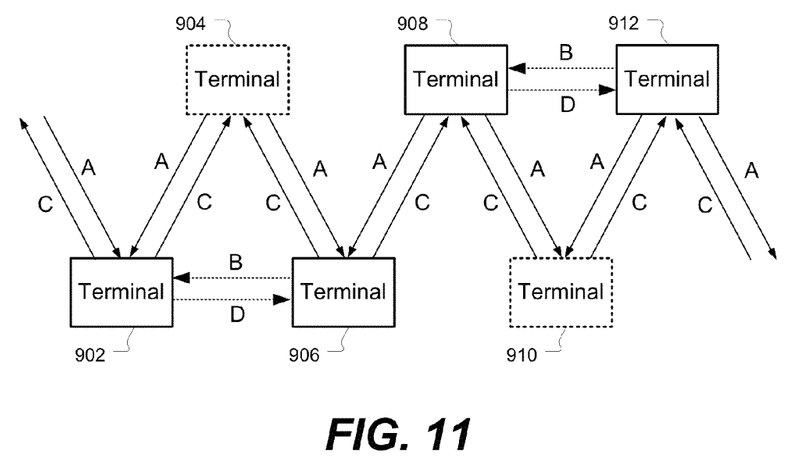

Similar reconfiguration can address situations where more than one terminal is disconnected. For example, FIG. 10 illustrates a similar network arrangement as FIG. 9, but a scenario where two terminals 904, 908 become disconnected. Links can be reestablished by switching one transceiver on terminal 902 from CA to DB, switching one transceiver on terminal 906 from CA to BD and one transceiver on terminal 906 from CA to DB, and switching one transceiver on terminal 910 from CA to BD. FIG. 11 illustrates another scenario where two terminals 904, 910 become disconnected. Links around terminal 904 can be established by switching a transceiver on terminal 902 from CA to DB and switching a transceiver on terminal 906 from CA to BD. Links around terminal 910 can be established by switching a transceiver on terminal 908 from AC to DB and switching a transceiver on terminal 912 from AC to BD.

Figure 12:
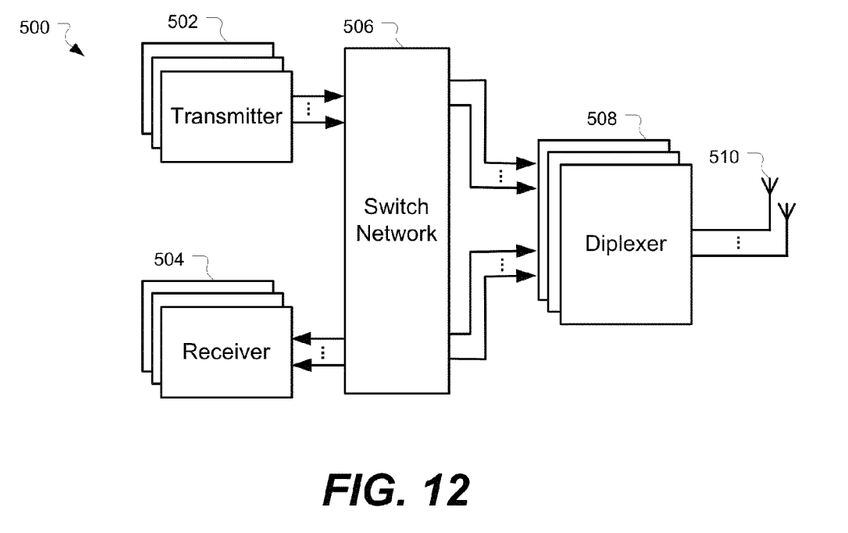
FIG. 12 is a block diagram of another example of a wireless terminal in accordance with some embodiments of the present invention.
Figure 13:
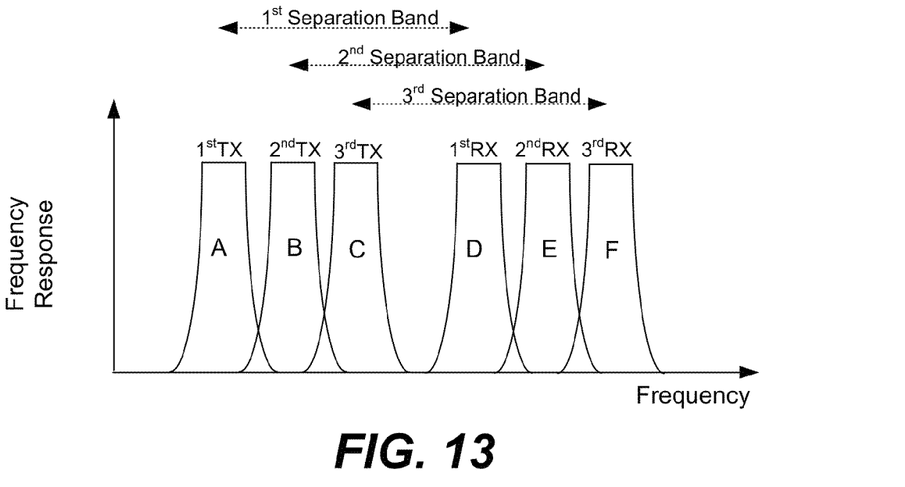
FIG. 13 is a graph of the frequency response of a six port diplexer which can provide three interlaced diplexers in accordance with some embodiments of the present invention.

Even greater flexibility can be provided using more than two interlaced diplexers. For example, FIG. 12 illustrates another embodiment of a terminal 500. The terminal 500 can, for example, be used as a terminal in any of the systems illustrated in FIGS. 1, 6, 7 and 9-12. The terminal 500 can include multiple transmitters 502 and multiple receivers 504. The transmitter and receivers can be connected through a switch network 506 to multiple diplexers 508. The diplexers can be connected to one or more antennas 510. The diplexers can provide for N frequency bands. For example, as described above, for N=4, two interlaced frequency pairs can be provided (each pair having a transmit band and a receive band). For N=6, three interlaced frequency pairs can be provided. In general, a diplexer with N filters (N being a multiple of two) can provide for N/2 interlaced diplexers. For example, FIG. 13 illustrates an example of a frequency response for a six port diplexer which can provide three interlaced diplexer responses. Three different band pairs (A-D, B-E, and C-F) are provided. Thus, six different genders can be provided (AD, DA, BE, EB, CF, and FC).

Figure 14:
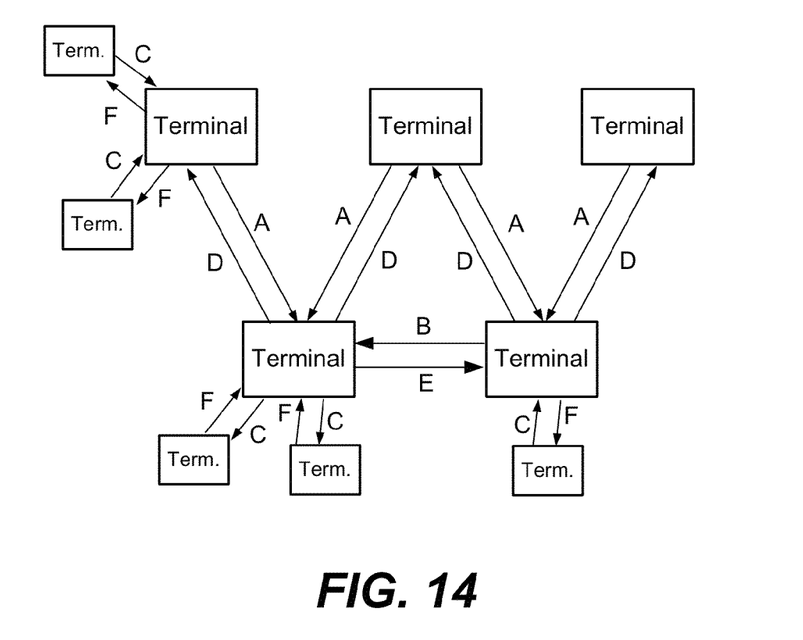
FIG. 14 is a block diagram of a network which provides several different types of links in accordance with some embodiments of the present invention.

With six different genders, various additional network configurations can be provided. For example, FIG. 14 illustrates an example of network which provides two different types of links. Cross-links are provided between some terminals using bands A-D and B-E, which allows for handling disconnected nodes in a manner similar to that illustrated above for FIGS. 9-12. Additional links (e.g. uplinks/downlinks for a hub spoke network) can be provided using bands C-F. If desired, adjacent terminals can use alternate genders for bands C-F. This can be useful, for example, where a cellular-like frequency reuse plan is used. Various examples of the terminals described above can be used in the system of FIG. 14.

Various operations can be performed in such a network to address changing connectivity. For example, a terminal can change gender on one its transceivers/diplexers to allow communications to be established to another terminal (e.g., switching from AC to CA). As another example, two terminals can switch genders and establish a communications link with each other (e.g., a first terminal switching from AC to CA and a second terminal switching from BD to CA, or a first terminal switching from AC to CA and a second terminal switching from CA to AC). As yet another example, a terminal can maintain gender for one link while switching gender on another link (e.g., maintaining BD while switching AC to CA).

Figure 15:
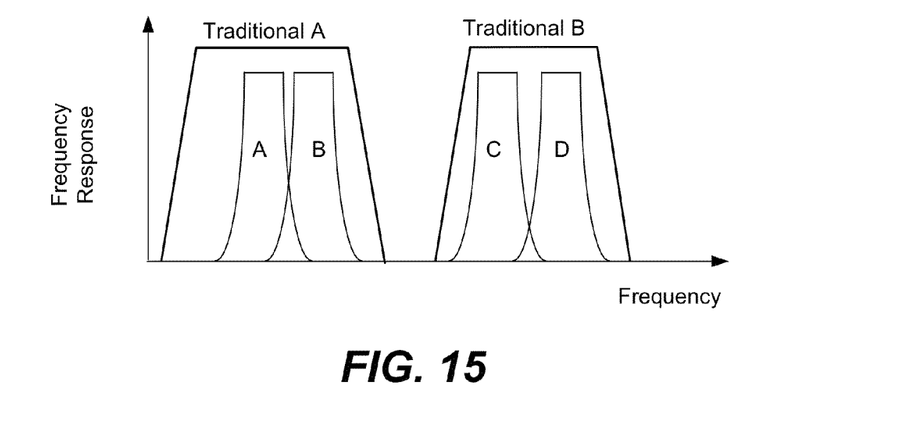
FIG. 15 is a graph of the frequency response of a diplexer which is backwards compatible with a legacy system in accordance with some embodiments of the present invention.

Backwards compatibility with existing two-gender systems can also be provided. For example, FIG. 15 illustrates an example of a two band pair system which places two transmit bands A and B inside a traditional A-band used by a legacy system. Two receive bands are placed within the traditional B-band used by the legacy system. Thus, terminals using the two interlaced diplexers (A-C and B-D) can communicate with each other using any of four different genders (AC, CA, BD, DC) and can communicate with legacy terminals by using an appropriate one of the genders.

Figure 16:
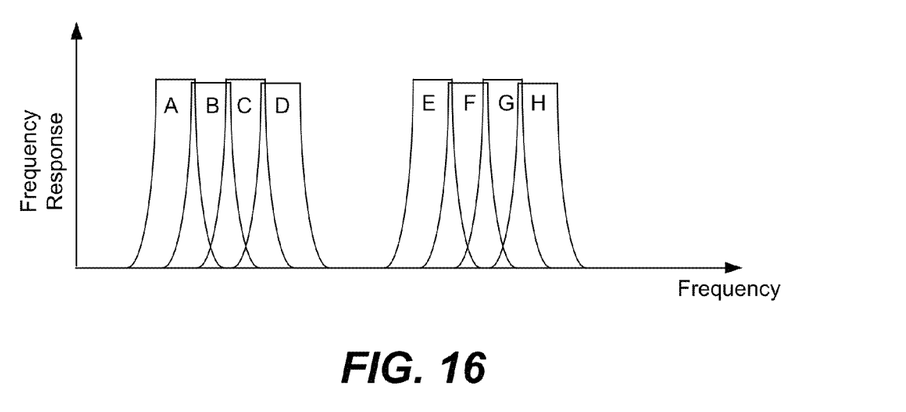
FIG. 16 is a graph of the frequency response of an 8-plexer which can provide four interlaced diplexers in accordance with some embodiments of the present invention.

Note that additional diplexer band pairs can be provided where the rolloff of the filters overlaps slightly. For example, referring back to FIG. 13, some bandwidth was unused between A and B and between the B and C bands. These bands can be used by other terminals in the network, relying on physical separation to provide desired isolation. For example, FIG. 16 illustrates the frequency response of an 8-plexer (four diplexer pairs) where the filtering response overlaps for adjacent bands. The peak response of the bands is shown slightly different from each other to make the responses easier to distinguish. It will be appreciated that the diplexer peak response (e.g., insertion loss) may be the same for each band.

Using the 8-plexer of FIG. 16, a particular terminal may not use two adjacent bands, but instead can use bands separated by at least one intervening band to provide desired isolation. For example, a terminal can simultaneously uses the A-E and C-G bands at the same time, but not use the B-F and D-H bands while using the A-E and C-G bands due to potential self-interference. Other terminals, however, can use the B-D and D-H bands, but not use the A-E and C-G bands. This can provide even greater flexibility within a network while maintaining high frequency use efficiency.

Various examples of terminal arrangements and network arrangements have been illustrated using example terminals. It will be appreciated that a network can include any one or more of the different terminals types illustrated herein. Moreover, while certain details have been described with respect to specific terminal arrangements, those details can be applied to other terminal arrangements as well.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

What is claimed is:

1. A wireless communications terminal, comprising:
a plurality of wireless transmitters;
a plurality of wireless receivers;
a plurality of interlaced diplexers coupled to the plurality of wireless transmitters and the plurality of wireless receivers;
wherein the plurality of diplexers comprises: a first diplexer comprising a first transmit band and a first receive band separated by a first separation band and a second diplexer comprising a second transmit band and a second receive band separated by a second separation band; and
wherein one of the first transmit band and the first receive band are within the second separation band, and one of the second transmit band and the second receive band are within the first separation band.

2. The terminal of claim 1, further comprising a first antenna coupled to the first diplexer, and a second antenna coupled to the second diplexer, wherein the first antenna and the second antenna are physically separated.

3. The terminal of claim 2, wherein:
the first diplexer provides a first amount of isolation between the first transmit band and the first receive band;
the first diplexer provides a second amount of isolation between the first receive band and the second transmit band, wherein the second amount of isolation is less than the first amount of isolation; and
the physical separation provides a third amount of isolation between the first receive band and the second transmit band, wherein a sum of the second amount of isolation and the third amount of isolation is greater than or equal to the first amount of isolation.

4. The terminal of claim 1, further comprising:
a switch network disposed between the first diplexer and one of the plurality of wireless transmitters and one of the plurality of wireless receivers, wherein the first diplexer is capable of swapping the transmit band and the receive band so that the terminal is capable of changing between at least two different genders.

5. The terminal of claim 4, further comprising:
a switch network disposed between the second diplexer and one of the plurality of wireless transmitters and one of the plurality of wireless receivers, wherein the second diplexer is capable of swapping the transmit band and the receive band so that the terminal is capable of changing between at least four different genders.

6. The terminal of claim 1, wherein the first transmit band and the second transmit band are separated by a third separation band and the bandwidth of the first separation band is substantially greater than the third separation band.

7. The terminal of claim 1, wherein:
the plurality of diplexers comprises a third diplexer comprising a third transmit band and a third receive band separated by a third separation band; and
wherein one of the third transmit band and the third receive band are within the first separation band.

8. A communications system comprising a plurality of terminals as in claim 1.

9. A wireless communications terminal, comprising:
a first wireless transceiver capable of frequency division duplex operation;
a first diplexer coupled to the first wireless transceiver and providing duplexing for a first pair of bands separated by a first separation band;
a first antenna coupled to the first diplexer;
a second wireless transceiver capable of frequency division duplex operation;
a second diplexer coupled to the second wireless transceiver, the second diplexer providing duplexing for a second pair of bands separated by a second separation band, wherein the first separation band and the second separation band partially overlap; and
a second antenna coupled to the second diplexer and spaced apart from the first antenna.

10. The terminal of claim 9, further comprising:
a first transfer switch disposed between the first wireless transceiver and the first diplexer; and
a second transfer switch disposed between the second wireless transceiver and the second diplexer.

11. The terminal of claim 9, wherein the bandwidth of the first separation band is substantially greater than the bandwidth of either one band of the first pair of bands.

12. A communications system comprising a plurality of terminals as in claim 9.

13. A method of operating a wireless network, comprising:
providing a first terminal comprising a plurality of interleaved diplexers, wherein the first terminal transmits within a first frequency band and receives within a second frequency band, wherein the first frequency band and second frequency band are separated by a first separation band, and wherein the second terminal also transmits within a third frequency band and receives within a fourth frequency band, wherein the third frequency band and the fourth frequency band are separated by a second separation band, and wherein one of the first frequency band and the second frequency band are within the second separation band, and one of the third frequency band and the fourth frequency band are within the first separation band;
providing a second terminal comprising a plurality of interlaced diplexers, wherein the second terminal transmits within the second frequency band and receives within the first frequency band, and wherein the third terminal transmits within the third frequency band and receives within the fourth frequency band;

establishing full duplex communications between the first terminal and the second terminal using the first frequency band and the second frequency band.

14. The method of claim 13, further comprising:

providing a third terminal comprising a plurality of interlaced diplexers, wherein the third terminal transmits within the first frequency band and receives within the second frequency band, and wherein the third terminal transmits within the fourth frequency band and receives within the third frequency band establishing full duplex communications between the first terminal and the third terminal using the third frequency band and the fourth frequency band simultaneously with the full duplex communications between the first terminal and the second terminal; and establishing full duplex communications between the second terminal and the third terminal using the third frequency band and the fourth frequency band simultaneously with the full duplex communications between the first terminal and the second terminal and simultaneously with the full duplex communications between the first terminal and the third terminal.

15. The method of claim 13, further comprising:

providing a plurality of third terminals each of which transmits within the fourth frequency band and receives within the third frequency band;

establishing full duplex communications between the first terminal and each of the plurality of third terminals using the third frequency band and the fourth frequency band simultaneously with the full duplex communications between the first terminal and the second terminal;

providing a plurality of fourth terminals each of which transmits within the fourth frequency band and receives within the third frequency band; and establishing full duplex communications between the second terminal and each of the plurality of fourth terminals using the third frequency band and the fourth frequency band simultaneously with the full duplex communications between the first terminal and the third terminal.

16. The method of claim 13, further comprising:

providing a third terminal comprising a plurality of interlaced diplexers, wherein the third terminal transmits within the first frequency band and receives within the second frequency band, and wherein the third terminal transmits within the fourth frequency band and receives within the third frequency band;

establishing full duplex communications between the second terminal and the third terminal using the third frequency band and the fourth frequency band simultaneously with the full duplex communications between the first terminal and the second terminal;

losing all communications to the second terminal; and establishing full duplex communications between the first terminal and the third terminal using the third frequency band and the fourth frequency band.

17. The method of claim 13, further comprising:

providing a third terminal comprising a plurality of interlaced diplexers, wherein the third terminal transmits the third terminal transmits within the fourth frequency band and receives within the third frequency band;

establishing full duplex communications between the second terminal and the third terminal using the third frequency band and the fourth frequency band simultaneously with the full duplex communications between the first terminal and the second terminal;

losing all communications to the second terminal;

switching the third terminal to transmit within the second frequency band and receive within the first frequency band; and establishing full duplex communications between the first terminal and the third terminal using the first frequency band and the second frequency band.

18. The method of claim 13, further comprising:

providing a third terminal comprising a plurality of interlaced diplexers, wherein the third terminal transmits within the first frequency band and receives within the second frequency band;

establishing full duplex communications between the second terminal and the third terminal using the first frequency band and the second frequency band simultaneously with the full duplex communications between the first terminal and the second terminal;

losing all communications to the second terminal; and switching the third terminal to transmit in the second band and receive in the first band; and establishing full duplex communications between the first terminal and the third terminal using the first frequency band and the second frequency band.

* * * * *